Header omitted 3,489,880
SELECTIVELY HEATED CHAFING DISH
Harold Bloomfield, Chicago, and August C. Purpura, Melrose Park Village, Ill., assignors to Bloomfield Industries, Inc., Chicago, Ill., a corporation of Delaware
Filed Nov. 9, 1967, Ser. No. 681,681
Int. Cl. F21d *11/00*
U.S. Cl. 219—436                                2 Claims

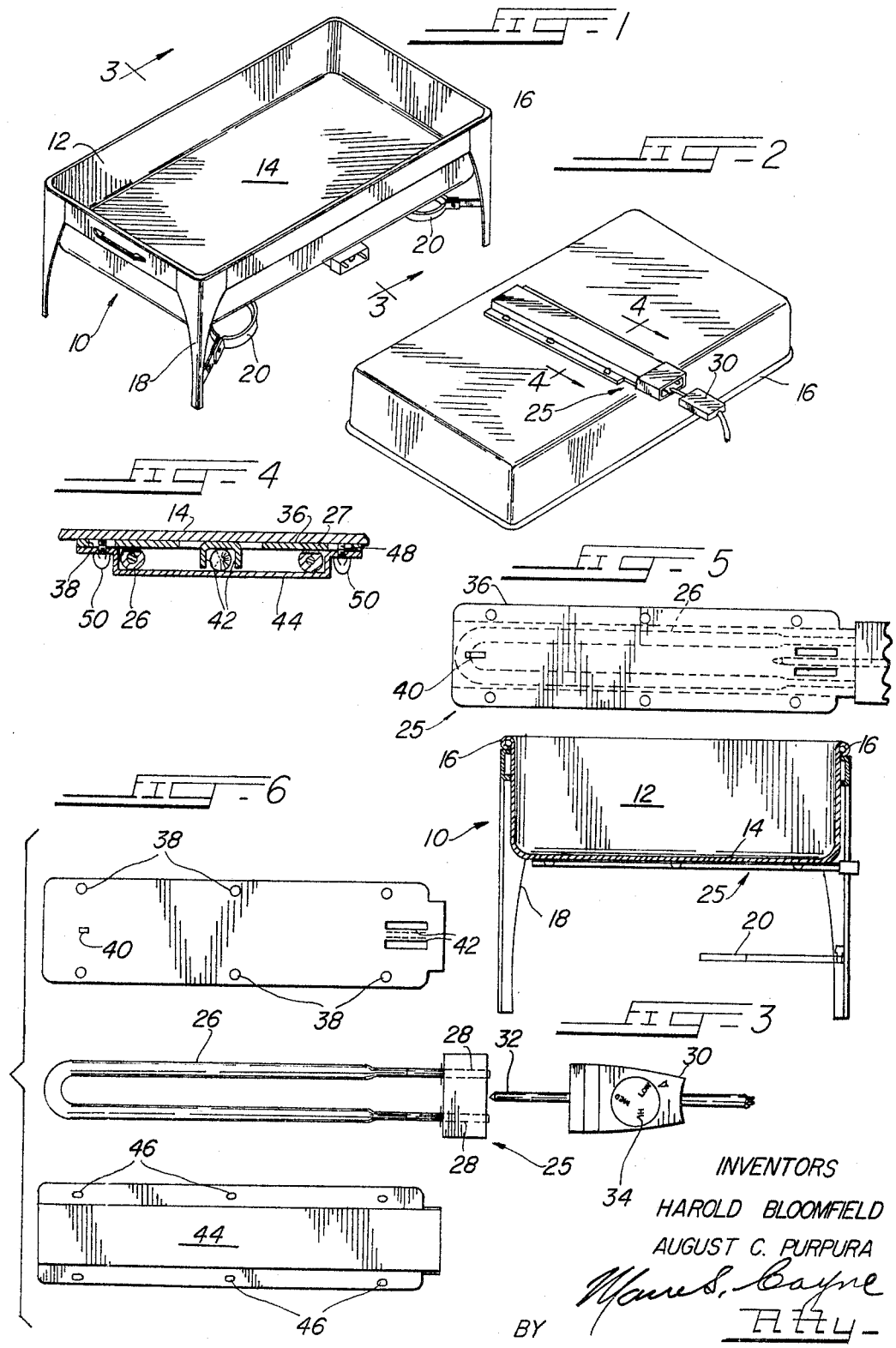

ABSTRACT OF THE DISCLOSURE

A chafing dish having an electrical heating unit which may be readily attached to or removed from the pan. The heating unit includes a highly conductive heat distributing plate to improve the poor heat conducting properties of a stainless steel pan.

---

This invention relates to cooking and serving utensils commonly known as chafing dishes and more particularly to a chafing dish which may be selectively heated by electrical energy or an open flame.

Chafing dishes are old and well-known, finding particular usefulness for maintaining foods warm while serving and for cooking away from a stove or directly at the table. Heretofore, chafing dishes were designed to be heated by only one of two heat sources, namely, a live flame or electrical energy. The exclusivity of the two modes of operation is readily understandable when it is considered that electrically heated devices had a shielded electrical heating element covering all or substantially all of the bottom of the pan so that the application of a flame to the bottom of the pan was ineffectual. On the other hand, where an open flame was used to contact a single layered pan bottom, there was of course no false bottom within which an electrical heating element could be positioned.

Another problem relating to electrically heated chafing dishes results from the heat conductive properties of the metals of construction. It is generally conceded that for considerations of sanitation, tastelessness, durability and ease of cleaning, the most desirable material is stainless steel. Thus, chafing dishes used under heavy wear conditions, such as in hotels, banquet halls, restuarants, and the like, invariably are fashioned from stainless steel. However, it is also well-known that stainless steel is a comparatively poor conductor of heat. As a result, most or all of such heavy duty stainless steel chafing dishes are still inefficiently heated by open flame from the burning of a candle or one of the well-known "canned heat" chemicals.

It is therefore an important object of this invention to provide a chafing dish which overcomes all of the problems described hereinabove.

Another object is to afford a chafing dish of the character described which may be selectively heated by flame or electrical energy as desired.

A further object is to provide a chafing dish of the character described which may be made of stainless steel as well as any other suitable metal. A related object is to provide such a chafing dish having means for distributing the heat from a central electrical source to improve the heat conducting characteristics of a stainless steel pan.

Still another object is to afford a chafing dish of the character described having electrical heating means which may be readily attached to and removed from the pan.

Yet another object is to provide a chafing dish of the character described which is easy to clean and may be safely immersed in water even with the electrical heating element attached thereto.

Still a further object is to afford a chafing dish of the character described having means for adjusting the amount of heat delivered to the pan by the electrical heating means.

Yet a further object is to provide a chafing dish of the character described which is relatively inexpensive and simple to operate and yet is most efficient and durable.

With the foregoing and other objects in view which will appear as the description proceeds, the invention comprises a pan of ordinary heavy duty stainless steel construction. Associated with the pan is an electrical heating unit assembly which includes a highly conductive heat distribution plate. Threaded means is provided for readily attaching the assembly to the pan with the distribution plate in intimate contact with the pan bottom. The pan is adapted to be retained in the customary supporting framework so that a flame may be used as the heat source irrespective of whether the electrical heating unit is attached to the pan.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is an isometric view of a chafing dish embodying the principles of the invention and showing the same operationally retained in a supporting frame;

FIG. 2 is a bottom plan view of the pan with the electrical heating unit attached thereto;

FIG. 3 is a vertical sectional view taken on the plane of line 3—3 in FIG. 1 and viewed in the direction indicated;

FIG. 4 is a horizontal sectional view taken on the plane of line 4—4 in FIG. 2 and viewed in the direction indicated;

FIG. 5 is a top plan view of the electrical heating unit assembly showing the same detached from the pan; and FIG. 6 is an exploded top plan view showing each of the elements of the electrical heating unit assembly.

Turning more particularly to the various figures of the drawings, it will be seen that the reference numeral 10 indicates generally a selectively heated chafing dish embodying the principles of the invention. The chafing dish 10 comprises a heavy duty stainless steel pan 12 of ordinary construction and having a bottom wall 14 and a top perimetric flange 16. The flange 16 cooperates with an open frame 18 for releasably supporting the pan therein in well-known manner. It will be noted that the frame 18 is provided with a pair of pivotally mounted receptacles 20, 20 adapted to retain a source of burning heat for heating the pan with an open flame when desired.

An electrical heating unit assembly 25 is removably attached to the bottom wall 14 of the pan 12 as indicated in FIGS. 1, 2, 4 and 5 of the drawings. The assembly 25 comprises a U-shaped metal heating element 26 of the "calrod" type, said element terminating in a pair of male prongs 28, 28. It is important to note that the heating element 26 is flattened as at 27 on at least one side thereof (see FIG. 4) for reasons which will become apparent as the description proceeds. Cooperating with the prongs 28 to supply electrical energy to the heating element 26 is a female member 30 of known construction and which is provided with a thermostatic probe 32 and temperature adjustment means 34.

The assembly 25 comprises further a combination mounting and heat distribution plate 36. The plate 36 is made from highly heat conductive metal, in this case aluminum, and is formed with a plurality of mounting openings 38 along the longitudinal edges thereof. Adjacent one end thereof, the plate 38 has struck therefrom a finger 40 which serves to position and retain the heating element 26. A pair of tongues 42, 42 are struck from the plate 36 adjacent the opposite end thereof and said tongues cooperate to provide a frictionally snug receptacle for the thermostatic probe 32.

A generally channel-shaped shield plate 44 completes the assembly 25 and said plate is formed with marginal openings 46 positioned in alignment with the openings 38 in the heat distribution plate 36. It will thus be appreciated that the two plates 36 and 44 cooperate to afford a compact shield or enclosure for the heating element 26. At the same time it is important to note that the flat surface 27 of the heating element is maintained over its entire length in intimate contact with the heat distribution plate 36. Thus, virtually all of the heat produced by the element 26 is conducted away by the plate 36, and little if any heat is lost by radiation to the ambient atmosphere. In the latter regard, it is of course desirable that the shield plate 44 be made of a comparatively poor heat conductor, and in the embodiment illustrated, the same is made of stainless steel.

For purposes of releasably attaching the assembly 25 to the pan 12, a plurality of screw threaded shanks 48 is welded or otherwise permanently connected to the pan bottom wall 14. The threaded shanks 48 are arranged to project through the aligned openings 38, 46 so that thumb nuts such as 50 may be readily applied thereto as indicated in FIGS. 2 and 4 of the drawings.

It is important to note that when the assembly 25 is operationally attached to the pan 12 the heat distribution plate 36 is in intimate contact, over its entire area, with the bottom wall 14 of the pan. Due to the high conductivity of the plate 36, the heat from the element 26 is broadly distributed to the otherwise poorly conductive stainless steel pan bottom wall 14. The heat distribution plate 36 may be made of any desired length or width, although it is preferable not to cover the areas of the pan bottom wall 14 directly above the receptacles 20 so that the flame may be applied directly to the pan without necessitating removal of the assembly 25. In any case, the amount of heat delivered to the plate 36 and pan 12 may be readily adjusted and controlled by means of the thermostatic probe 32 and control 34, and of course the size or area of the plate 36.

When it is desired to wash the chafing dish, the assembly 25 may or may not be removed from the pan 12. The latter option presents no difficulties because once the member 30 is disconnected, the metal heating element 26 may be safely immersed in water without fear of damage.

It is believed that our invention, its mode of construction and assembly, and many of its advantages should be readily understood from the foregoing without further description, and it should also be manifest that while a preferred embodiment of the invention has been shown and described for illustrative purposes, the structural details are nonetheless capable of wide variation within the purview of our invention as defined in the appended claims.

What we claim and desire to secure by Letters Patent of the United States is:

1. A chafing dish comprising a pan having a bottom wall;
    a frame for supporting said pan in an elevated condition;
    an electrical heating unit assembly;
    means for releasably connecting said assembly to bottom wall;
    a heating element;
    highly heat conductive means associated with said heating element for dispersing the heat from said element over a greater area of said bottom wall;
    a flat heat distribution plate;
    said plate being in intimate contact with said bottom wall when said assembly is operationally attached to said wall;
    a shield plate is associated with said heat distribution plate, both of said plates being formed with aligned mounting openings;
    said first mentioned means comprising a plurality of screw-threaded shanks projecting from said bottom wall and adapted to pass through said aligned mounting openings; and
    a plurality of thumb nuts associated with said threaded shanks.

2. The chafing dish of claim 1 in which said heat distribution plate is made of aluminum and said pan is made of stainless steel.

References Cited

UNITED STATES PATENTS

| | | | |
|---|---|---|---|
| 2,602,131 | 7/1952 | Reich | 219—436 X |
| 3,201,566 | 8/1965 | Schreyer | 219—441 |
| 3,207,887 | 9/1965 | Drugmand et al. | 219—535 |

BERNARD A. GILHEANY, Primary Examiner

H. B. GILSON, Assistant Examiner

U.S. Cl. X.R.

219—441